United States Patent
Kienzler et al.

(10) Patent No.: US 12,015,342 B2
(45) Date of Patent: Jun. 18, 2024

(54) DC-DC CONVERTER AND METHOD FOR OPERATING A DC-DC CONVERTER

(71) Applicant: Robert Bosch GmbH, Stuttgart (DE)

(72) Inventors: Christoph Kienzler, Gerlingen (DE); Gholamabas Esteghlal, Stuttgart—Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 17/638,902

(22) PCT Filed: Aug. 10, 2020

(86) PCT No.: PCT/EP2020/072380
§ 371 (c)(1),
(2) Date: Feb. 28, 2022

(87) PCT Pub. No.: WO2021/037542
PCT Pub. Date: Mar. 4, 2021

(65) Prior Publication Data
US 2022/0311340 A1    Sep. 29, 2022

(30) Foreign Application Priority Data
Aug. 30, 2019 (DE) .............. 10 2019 213 068.2

(51) Int. Cl.
H02M 3/156     (2006.01)
H02M 1/00      (2007.01)
H02M 1/32      (2007.01)
H02M 3/24      (2006.01)

(52) U.S. Cl.
CPC ....... *H02M 3/1566* (2021.05); *H02M 1/0025* (2021.05); *H02M 1/32* (2013.01); *H02M 3/24* (2013.01)

(58) Field of Classification Search
CPC .................. H02M 3/1566; H02M 1/0025
See application file for complete search history.

(56) References Cited

U.S. PATENT DOCUMENTS

| | | | |
|---|---|---|---|
| 6,429,709 B1 | 8/2002 | Hall et al. | |
| 2004/0218319 A1* | 11/2004 | Sae-Ueng | H02M 1/36 361/18 |
| 2005/0269882 A1* | 12/2005 | Kobayashi | H02J 9/062 307/64 |

(Continued)

FOREIGN PATENT DOCUMENTS

| | | | | |
|---|---|---|---|---|
| DE | 102014225827 A1 * | 6/2016 | ........... | H02M 3/157 |
| DE | 102016219740 A1 | 4/2018 | | |

(Continued)

OTHER PUBLICATIONS

Translation of International Search Report for Application No. PCT/EP2020/072380 dated Nov. 17, 2020 (2 pages).

*Primary Examiner* — Gustavo A Rosario-Benitez
(74) *Attorney, Agent, or Firm* — Michael Best & Friedrich LLP

(57) ABSTRACT

The present invention relates to the control of a DC-DC converter, wherein the gradient of a controlled variable is limited for the control of the DC-DC converter. A maximum current change in the DC-DC converter can be limited by limiting the gradient of the controlled variable in order to optionally prevent dangerous operating states of the DC-DC converter.

8 Claims, 3 Drawing Sheets

(56) References Cited

U.S. PATENT DOCUMENTS

| | | | |
|---|---|---|---|
| 2012/0074917 A1* | 3/2012 | Chao | H02M 3/155 |
| | | | 323/282 |
| 2012/0217873 A1* | 8/2012 | Tanaka | H05B 45/59 |
| | | | 315/308 |
| 2013/0121034 A1* | 5/2013 | Takegami | H02M 3/33584 |
| | | | 363/17 |
| 2015/0364947 A1* | 12/2015 | Murayama | H02M 1/4225 |
| | | | 320/108 |
| 2019/0253014 A1* | 8/2019 | Iwaji | H02P 21/02 |
| 2020/0112241 A1* | 4/2020 | Wang | H02M 3/33523 |
| 2020/0186026 A1* | 6/2020 | Esteghlal | H02M 3/04 |
| 2021/0194353 A1* | 6/2021 | Thomas | H02M 1/4216 |
| 2021/0211057 A1* | 7/2021 | Esteghlal | H02M 3/00 |

FOREIGN PATENT DOCUMENTS

| | | |
|---|---|---|
| JP | 2005176567 A | 6/2005 |
| JP | 2011030343 A | 2/2011 |
| WO | 2017162408 A1 | 9/2017 |

* cited by examiner

DC-DC CONVERTER AND METHOD FOR OPERATING A DC-DC CONVERTER

BACKGROUND OF THE INVENTION

The present invention relates to a DC-DC converter and a method for operating a DC-DC converter.

Document DE 10 2016 219 740 A1 discloses a DC-DC converter having a plurality of DC-DC converter modules connected in parallel. In this case, a common voltage regulator is provided for all of the DC-DC converter modules. Furthermore, separate current regulation is provided for each DC-DC converter module.

DC-DC converters are intended for converting a DC input voltage into a DC output voltage, wherein the voltage level of the DC input voltage can be different than the voltage level of the DC output voltage. The output voltage and an output current of the DC-DC converter can be set in accordance with a preset setpoint value by means of closed-loop control.

SUMMARY OF THE INVENTION

The present invention discloses a DC-DC converter and a method for operating a DC-DC converter having the features of the independent patent claims. Further advantageous embodiments are the subject matter of the dependent patent claims.

Accordingly, the following is provided:

A DC-DC converter comprising a first control device, a second control device, a combination element, a third control device and at least one DC-DC converter module. The first control device is designed to determine a first controlled variable. The first controlled variable can be determined in particular using a value for a present input voltage, a value for the present input current and a setpoint value for an output voltage. The second control device is designed to determine a second controlled variable. The second controlled variable can be determined in particular using the setpoint value for the output voltage and the value for the present output voltage. The combination element is designed to combine the first controlled variable and the second controlled variable. The combination of the first and second controlled variables can be output as setpoint controlled variable. The third control device is designed to limit a gradient of the setpoint variable, i.e. the combination of the first and second controlled variables, to a predetermined minimum value and/or maximum value. The setpoint controlled variable limited by the third control device can be provided as output controlled variable. The at least one DC-DC converter module is designed to convert a DC input voltage into a DC output voltage using the output controlled variable.

Furthermore, the following is provided:

A method for operating a DC-DC converter. The method comprises a step for determining a first controlled variable using a value for a present input voltage, a value for a present input current and a setpoint value for an output voltage. Furthermore, the method comprises a step for determining a second controlled variable using the setpoint value for the output voltage and the value for the present output voltage. Furthermore, the method comprises a step for combining the first controlled variable and the second controlled variable to give a setpoint controlled variable and a step for limiting a gradient of the setpoint controlled variable. In particular, the setpoint controlled variable can be limited to a predetermined minimum value and/or a predetermined maximum value. The setpoint controlled variable limited in this way can be provided as output controlled variable. Finally, the method comprises a step for driving at least one DC-DC converter module, wherein the DC-DC converter module can be driven using the output controlled variable.

ADVANTAGES OF THE INVENTION

The present invention is based on the knowledge that an electrical current in a DC-DC converter can possibly rise or fall very steeply in particular in the boost operating mode, depending on the control response. Such a very quick change in the rise or fall of the electrical current in the DC-DC converter can possibly represent a very severe load for the electrical component parts in the DC-DC converter. Sometimes, this can until now result in destruction of component parts in the DC-DC converter.

It is therefore a concept of the present invention to take into account this knowledge and provide closed-loop control for a DC-DC converter which can prevent an operating state with an excessively severe rise or fall in the electrical current in the DC-DC converter. For this purpose, it is provided to limit the gradient of a controlled variable for driving the DC-DC converter. For example, the controlled variable may in this case be a duty factor for the driving of the switching elements in the DC-DC converter. By virtue of the limitation of the gradient in the controlled variable, it is therefore also possible to limit the maximum rise or fall in the electrical current in the DC-DC converter. Furthermore, whilst maintaining the preset limits for the rise or fall in the electrical current, it is possible to set a desired setpoint voltage or a desired setpoint current as quickly as possible without in the process exceeding the limits for overloading of the component parts in the DC-DC converter.

In accordance with one embodiment, the third control device is designed to limit the gradient of the setpoint controlled variable using the value for the present input voltage and the value for the present output voltage. The third control device can determine the controlled variable, for example, from the values for the present input voltage and the present output voltage of the present operating state and in particular the presently set controlled variable in the DC-DC converter module. Correspondingly, a gradient of the controlled variable which is to be set newly can be determined from the comparison between the present controlled variable and the preset setpoint controlled variable. If this gradient exceeds a preset limit, the third control device can restrict the controlled variable which is to be set newly to a controlled variable in accordance with the preset limit.

In accordance with one embodiment, the at least one DC-DC converter module comprises a transformer. The transformer can be provided in particular between the input terminal and the output terminal of the DC-DC converter module. In this case, the third control device can be designed to limit the gradient of the setpoint controlled variable using the transformation ratio of the transformer. The transformation ratio can in particular denote the ratio of the turns between a primary coil and a secondary coil of the transformer. This transformation ratio can also be used, in addition to the present input voltage and the present output voltage, for the determination of the present settings of the DC-DC converter.

In accordance with one embodiment, the third control device is designed to limit a maximum current change in the DC-DC converter. The maximum current change can in this case relate, for example, to the input current or the output current of the DC-DC converter. By limitation of the current change and therefore limitation of the current gradient in the DC-DC converter, it is possible to ensure that overloading of the component parts in the DC-DC converter can be avoided.

In accordance with one embodiment, the at least one DC-DC converter module of the DC-DC converter is operated in a boost converter operating mode. In particular in the boost converter operating mode, it is possible for overloading of the component parts to occur above a determined controlled variable, in particular above a determined duty factor, in the event of severe changes in the electrical current, which overloading can, until now, result in damage to the component parts. By limitation of the controlled variable and therefore of the change in the electrical current, such hazardous operating states can be prevented.

The above configurations and developments can be combined with one another as desired, insofar as this is sensible. Further configurations, developments and implementations of the invention also include combinations which have not been explicitly mentioned of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the invention will be explained below with reference to the figures, in which.

DETAILED DESCRIPTION

Figure 1:
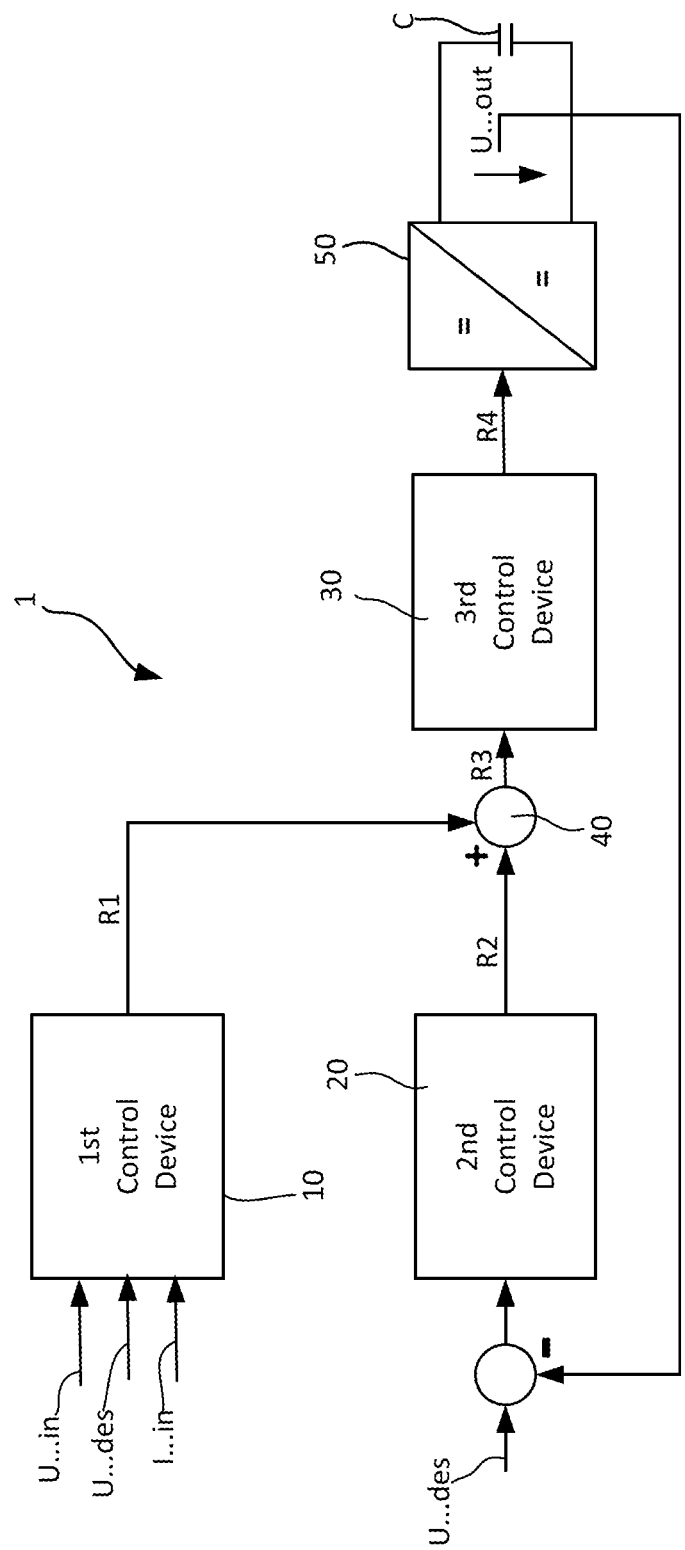
FIG. 1 shows a schematic illustration of a block circuit diagram of a DC-DC converter in accordance with one embodiment.

FIG. 1 shows a schematic illustration of a basic circuit diagram, as forms the basis of a DC-DC converter 1 in accordance with one embodiment. The DC-DC converter 1 can comprise one or more DC-DC converter modules 50, which convert a DC input voltage U_in into an output voltage U_out. Although only a single DC-DC converter module 50 is illustrated in FIG. 1, it is in principle also possible to operate a plurality of DC-DC converter modules 50 in parallel. The output voltage U_out and/or an output current can in this case be set by means of corresponding closed-loop control. A load, for example a capacitor C, can be connected at the output of the DC-DC converter 1.

For the closed-loop control of the DC-DC converter 1, in particular of the DC-DC converter module 50, for example, a first control device 10 can be provided. This first control device 10 can determine, for example as part of feedforward control, a first controlled variable R1. The first controlled variable R1 can be determined, for example, on the basis of the input voltage U_in and a desired setpoint value U_des for the output voltage of the DC-DC converter. Furthermore, the electrical current in the DC-DC converter, in particular the electrical current I_in at the input of the DC-DC converter module 50, can also be taken into consideration for the determination of the first controlled variable R1. Furthermore, if appropriate, a transformation ratio N of a transformer in the DC-DC converter module 50 can also be taken into consideration for the determination of the first controlled variable R1.

Furthermore, a second controlled variable R2 can be determined by means of a second control device 20 as part of voltage regulation. The second controlled variable R2 can be determined in particular taking into consideration the setpoint value U_des for the output voltage of the DC-DC converter 1 and the actual present value U_out at the output of the DC-DC converter 1.

The first controlled variable R1 from the first control device 10 and the second controlled variable R2 from the second control device 20 can be combined, for example summated, in a combination device 40. The combination of the first controlled variable R1 and the second controlled variable R2 can be output as setpoint controlled variable R3 by the combination device 40. This setpoint controlled variable R3 therefore represents a controlled variable which should be set taking into consideration the present output voltage U_out and the further boundary conditions, such as, for example, input voltage U_in, input current I_in, etc., in order to achieve the desired output voltage U_des. The controlled variable may be, for example, the preset of a duty factor for driving the switching elements in the DC-DC converter module 50.

Under certain operating conditions, in particular above a specific duty factor, an excessively severe change in the controlled variable, in particular a severe change in the duty factor, can result in a severe change in the electrical current and therefore a high current gradient. In order to avoid damage to the components in the DC-DC converter 1, in particular the DC-DC converter module 50, the gradient of the controlled variable R3 and, associated with this, the current gradient, i.e. the change in the electrical current in the DC-DC converter 1, can be limited by means of the third control device 30. If the gradient of the controlled variable R3 from the combination device 40 exceeds a preset maximum value or if the (negative) gradient of the controlled variable R3 falls below a minimum value, the controlled variable R3 output by the combination device 40 can be limited. In this way, the third control device 3 can provide an output controlled variable R4, whose gradient moves within a preset window between a (positive) maximum value and a (negative) minimum value. This limited controlled variable R4 can thereupon be provided to the DC-DC converter module 50.

The third control device 30 can calculate, for example, a present working point R_cur from the present input voltage U_in, the transformation ratio N of the transformer in the DC-DC converter module 50 and the present output voltage U_out, as follows:

$$R\_cur = 1 - (U\_in \times N/(2 \times U\_out)).$$

If the setpoint controlled variable R3 is markedly greater than the present working point R_cur, this can result in an excessively high electrical current in the DC-DC converter. If, however, the setpoint controlled variable R3 is markedly lower than the present working point R_cur, no electrical current flows.

In order to avoid possible core saturation of the transformer in the DC-DC converter module 50, first the gradient of the setpoint controlled variable R3 can be limited between a positive gradient d_up and a negative gradient d_down by means of a ramp function f( ).

Furthermore, the current gradient can be limited, for example, to a maximum of 10%:

$$-0.1 < R4 - R\_cur < +0.1.$$

If 1.0 is added to this equation and the formula is set for the present working point, there thereby results as a general condition between a lower gradient d_min and an upper gradient d_max:

$$d\_min < R4 + (U\_in \times N/(2 \times U\_out)) < d\_max.$$

For this case, the gradient for the controlled variable of the DC-DC converter modules 50 can be limited further still to a maximum gradient d_slow by means of the ramp function f( ).

Figure 2:
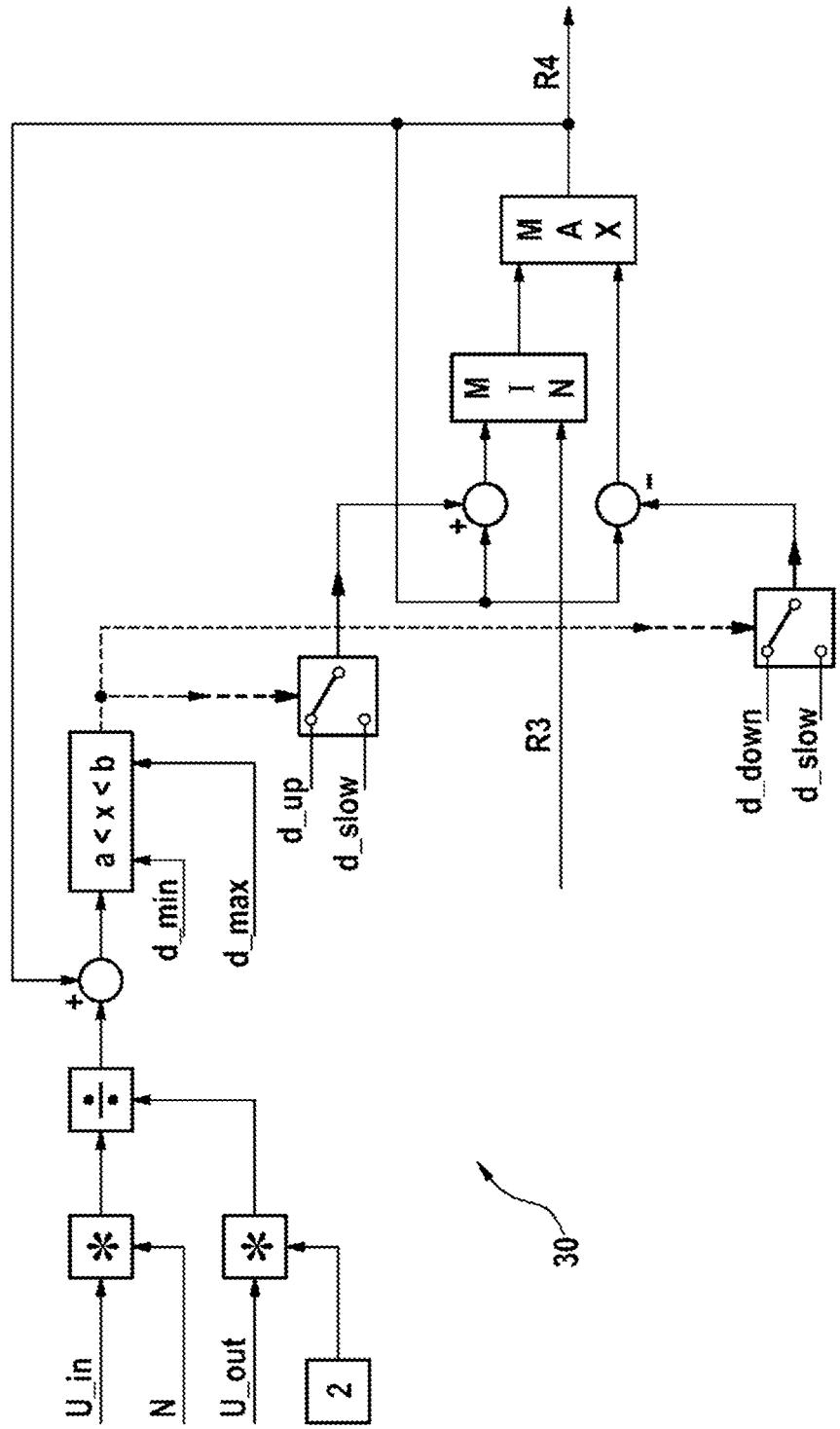
FIG. 2 shows a schematic illustration of a block circuit diagram, as forms the basis of a control device of a DC-DC converter in accordance with one embodiment.

FIG. 2 shows a schematic illustration of a block circuit diagram of a third control device 30 for limiting the gradient for the controlled variable of the DC-DC converter modules 50, as has been described above.

As can be seen in FIG. 2, the setpoint controlled variable R3, for example the combination of the first controlled variable R1 and the second controlled variable R2, can be limited in order to limit the gradient of the controlled variable R4 for driving the DC-DC converter modules 50. For this purpose, the present working point can be determined from the DC input voltage U_in, the transformation ratio of the transformer in the DC-DC converter module 50 and the DC output voltage U_out. Thereupon, this present working point can be limited corresponding to the limits d_min, d_max and the presets for the maximum gradients d_up, d_down and d_slow. The controlled variable R4 which has limited gradients can thereupon be output for driving the DC-DC converter modules 50.

Figure 3:
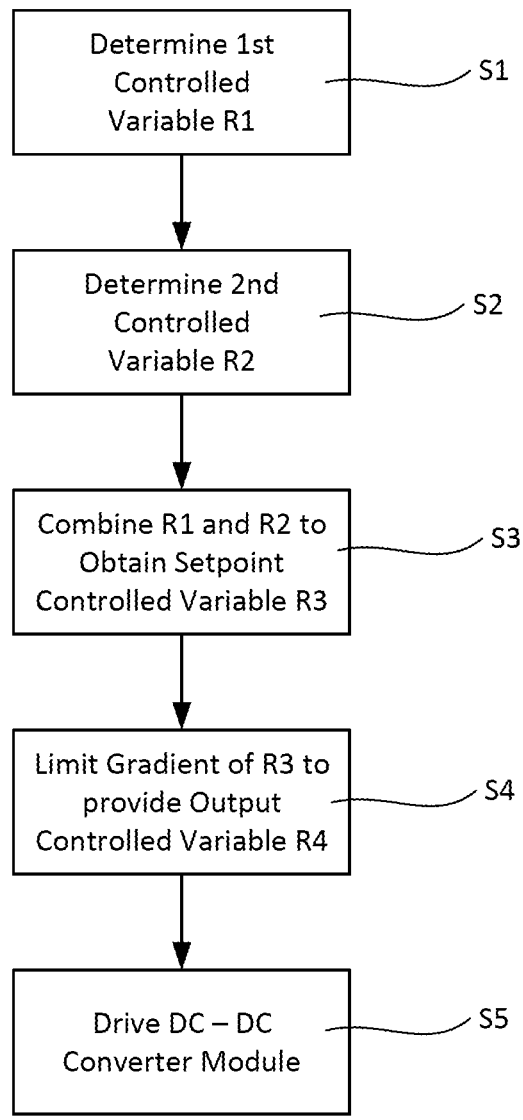
FIG. 3 shows a schematic illustration of a flowchart, as forms the basis of a method for operating a DC-DC converter in accordance with one embodiment.

FIG. 3 shows a schematic illustration of a flowchart, as forms the basis of a method for operating a DC-DC converter 1 in accordance with one embodiment.

In step S1, a first controlled variable is determined using a value for a present input voltage U_in, a value for the present input current I_in and a setpoint value for the output voltage U_des.

In step S2, a second controlled variable R2 is determined using the setpoint value for the output voltage U_des and a value for the present output voltage U_out.

In step S3, the first controlled variable R1 and the second controlled variable R2 are combined to give a setpoint controlled variable R3.

In step S4, the gradient of the setpoint controlled variable R3 is limited to a predetermined maximum value and/or a predetermined minimum value, and the thus limited setpoint controlled variable R3 is provided as output controlled variable R4.

The output controlled variable R4 which has limited gradients can thereupon be used to drive, in step S5, one or more DC-DC converter modules 50.

By way of summary, the present invention relates to driving of a DC-DC converter, wherein the gradient of a controlled variable for the driving of the DC-DC converter is limited. By virtue of the limitation of the gradient of the controlled variable, a maximum current change in the DC-DC converter can be limited in order to avoid possibly hazardous operating states of the DC-DC converter.

The invention claimed is:

1. A DC-DC converter (1), comprising:
a first control device (10), which is designed to determine a first controlled variable (R1) using a value for a present input voltage (U_in), a value for a present input current (I_in) and a setpoint value for an output voltage (U_des);
a second control device (20), which is designed to determine a second controlled variable (R2) using the setpoint value for the output voltage (U_des) and the value for the present output voltage (U_out);
a combination element (40), which is designed to combine the first controlled variable (R1) and the second controlled variable (R2) and to output said variables as a setpoint controlled variable (R3);
a third control device (30), which is designed to limit a gradient of the setpoint controlled variable (R3) to a predetermined minimum value and/or a predetermined maximum value and to provide the limited setpoint controlled variable (R3) as an output controlled variable (R4); and
at least one DC-DC converter module (50), which is designed to convert a DC input voltage (U_in) into a DC output voltage (U_out) using the output controlled variable (R4).

2. The DC-DC converter (1) as claimed in claim 1, wherein the third control device (30) is designed to limit the gradient of the setpoint controlled variable (R3) using the value for the present input voltage (U_in) and the value for the present output voltage (U_out).

3. The DC-DC converter (1) as claimed in claim 1, wherein the at least one DC-DC converter module (50) comprises in each case one transformer, and the transformer is arranged between an input terminal and an output terminal, and
wherein the third control device (30) is designed to limit the gradient of the setpoint controlled variable (R3) using a transformation ratio (N) of the transformer.

4. The DC-DC converter (1) as claimed in claim 1, wherein the third control device (30) is designed to limit a maximum current change in the DC-DC converter (1).

5. The DC-DC converter (1) as claimed in claim 1, wherein the at least one DC-DC converter module (50) is operated in a boost converter operating mode.

6. A method for operating a DC-DC converter (1), comprising the following steps:
determining (S1) a first controlled variable (R1) using a value for a present input voltage (U_in), a value for a present input current (I_in) and a setpoint value for an output voltage (U_des);
determining (S2) a second controlled variable (R2) using the setpoint value for the output voltage (U_des) and the value for the present output voltage (U_out);
combining (S3) the first controlled variable (R1) and the second controlled variable (R2) to give a setpoint controlled variable (R3);
limiting (S4) a gradient of the setpoint controlled variable (R3) to a predetermined minimum value and/or a predetermined maximum value and providing the limited setpoint controlled variable (R3) as an output controlled variable (R4); and
driving (S5) a number at least one DC-DC converter modules (50) using the output controlled variable (R4).

7. The method as claimed in claim 6, wherein the limiting (S4) of the gradient of the setpoint controlled variable (R3) to the predetermined minimum value and/or the predetermined maximum value is provided by using the value for the present input voltage (U_in) and the value for the present output voltage (U_out).

8. The method as claimed in claim 6, wherein the limiting (S4) of the gradient of the setpoint controlled variable (R3) to the predetermined minimum value and/or the predetermined maximum value is provided by using a transformation ratio (N) of a transformer.

* * * * *